US012362498B2

(12) United States Patent
Le Gall et al.

(10) Patent No.: US 12,362,498 B2
(45) Date of Patent: Jul. 15, 2025

(54) ELEMENTARY ANTENNA OF THE POLARIZATION AGILE TYPE AND OF THE CAVITY ANTENNA TYPE, ARRAY ANTENNA COMPRISING A PLURALITY OF SUCH ELEMENTARY ANTENNAS

(71) Applicants: THALES, Courbevoie (FR); UNIVERSITÉ DE BORDEAUX, Bordeaux (FR); INSTITUT POLYTECHNIQUE DE BORDEAUX, Talence (FR); Centre national de la recherche scientifique, Paris (FR)

(72) Inventors: Timothée Le Gall, Talence (FR); Anthony Ghiotto, Talence (FR); Gwenaël Morvan, Montigny le Bretonneux (FR); Stefan Varault, Meudon (FR); Bruno Louis, Saint Maur des Fosses (FR)

(73) Assignees: THALES, Courbevoie (FR); UNIVERSITÉ DE BORDEAUX, Bordeaux (FR); INSTITUT POLYTECHNIQUE DE BORDEAUX, Talence (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 266 days.

(21) Appl. No.: 17/929,487

(22) Filed: Sep. 2, 2022

(65) Prior Publication Data

US 2023/0076937 A1 Mar. 9, 2023

(30) Foreign Application Priority Data

Sep. 6, 2021 (FR) .................................... 21 09301

(51) Int. Cl.
*H01Q 15/24* (2006.01)
*H01Q 13/10* (2006.01)
(Continued)

(52) U.S. Cl.
CPC .......... *H01Q 15/242* (2013.01); *H01Q 13/10* (2013.01); *H01Q 13/18* (2013.01); *H01Q 21/245* (2013.01)

(58) Field of Classification Search
CPC .... H01Q 15/242; H01Q 13/10; H01Q 21/245; H01Q 13/18
See application file for complete search history.

(56) References Cited

U.S. PATENT DOCUMENTS

| | | | | |
|---|---|---|---|---|
| 4,803,494 | A | 2/1989 | Norris et al. | |
| 2003/0197647 | A1 * | 10/2003 | Waterman | H01Q 13/18 343/700 MS |
| 2012/0188917 | A1 * | 7/2012 | Knox | H01Q 1/2225 370/277 |

OTHER PUBLICATIONS

Q. Yang et al. Millimeter-Wave Dual-Polarized Slot Array Antenna Using a TE210 and TE120 Mode Cavity, 2020 14th European Conference on Antennas and Propagation (EuCAP), Copenhagen, Denmark, 2020, pp. 1-4 (Year: 2020).*
(Continued)

*Primary Examiner* — Dameon E Levi
*Assistant Examiner* — Yonchan J Kim
(74) *Attorney, Agent, or Firm* — ArentFox Schiff LLP

(57) ABSTRACT

This elementary antenna includes a cavity delimited by front and rear faces and side walls, the front face being provided with first and second slots arranged in a cross, so that, when the cavity operates in a TE210 mode, a wave polarized perpendicularly to the first slot is emitted and when the cavity operates in a TE120 mode, a wave polarized perpendicularly to the second slot is emitted. This elementary antenna is characterized in that the rear face is brought to a
(Continued)

reference electric potential, and in that the elementary antenna includes an excitation device, such as a metallized via, capable of exciting the front face through the cavity, the excitation device exciting the front face at a plurality of excitation points, distributed over the front face and presenting a common predefined impedance.

10 Claims, 11 Drawing Sheets

(51) Int. Cl.
*H01Q 13/18* (2006.01)
*H01Q 21/24* (2006.01)

(56) References Cited

OTHER PUBLICATIONS

French Search Report issued by the French Patent Office in corresponding French Application No. 2109301, mailed Apr. 11, 2022.
Srivastava, G., et al., "A Differential Dual-Polarized SIW Cavity-Backed Slot Antenna", IEEE Transactions on Antennas and Propagation, vol. 67, No. 5, pp. 3450-3454, May 2019.

* cited by examiner

ELEMENTARY ANTENNA OF THE POLARIZATION AGILE TYPE AND OF THE CAVITY ANTENNA TYPE, ARRAY ANTENNA COMPRISING A PLURALITY OF SUCH ELEMENTARY ANTENNAS

CROSS-REFERENCE TO RELATED APPLICATIONS

This application claims priority to French Application No. 21 09301 filed on Sep. 6, 2021. The disclosure of the priority application is incorporated in its entirety herein by reference.

The field of the invention is that of polarization agile elementary antennas.

Such elementary antennas find their applications in radar imaging, jammers or even data links.

More particularly, in the field of radar imaging, one seeks antennas presenting increased emission efficiency, improved linearity as a function of emission power, improved signal-to-noise ratio, and increased power handling at reception.

The applicant has thus developed elementary antennas of the planar or patch antenna type, excited by slots, such as those described in the patent FR 3062523.

For the different emission/reception paths to be perfectly balanced, it is necessary that the excitation points of the radiating element of the elementary antenna present a common impedance, preferably equal to 50 ohms.

However, on an elementary antenna of the patch antenna type, the excitation points on the surface of the radiating element presenting such an impedance are limited in number.

The object of the present invention is therefore to solve this problem by proposing an elementary antenna which is agile in polarization and offers a greater number of possible excitation points.

For this purpose, the invention has as object an elementary antenna of the polarization agile type and of the cavity antenna type, including a cavity axially delimited by a front face and a rear face and laterally by side walls, the front face, which constitutes the radiating plane of the elementary antenna, being provided with a first straight slot and a second straight slot, the first and second slots being arranged so as to form together a cross, which is centered on a geometrical center of the front face and which defines four quadrants on the front face, so that, when the cavity is placed in a TE210 mode, a wave polarized perpendicularly to the first straight slot is emitted and when the cavity is placed in a TE120 mode, a wave polarized perpendicularly to the second straight slot is emitted. This elementary antenna is such that the rear face is brought to an electric reference potential, and the elementary antenna includes an excitation device, positioned at the rear of the cavity and capable of exciting the front face through the cavity, the excitation device exciting the front face at a plurality of excitation points that present a common predefined impedance, each quadrant of the front face carrying at least one excitation point.

In particular embodiments, the elementary antenna includes one or more of the following features, taken alone or in any technically possible combination.

The front and rear faces are square and the first and second slots are arranged parallel to the edges of the front face.

The common predefined impedance of the excitation points is 50 Ohms.

The rear face acts as an electrical mirror plane between a power supply layer of the excitation device, the power supply layer being located on one side of the rear face while the front face is located on the other side of the rear face.

Two excitation points symmetrically arranged relative to the first straight slot or relative to the second straight slot are excited by signals in phase opposition.

The excitation device includes a plurality of metallized vias electrically connecting a power supply layer, located at the rear of the rear face, and the front face, the power supply layer includes a plurality of power supply lines, each power supply line being related to a metallized via, each metallized via opening, onto the front face, to an excitation point.

Each metallized via is insulated from the rear face as it passes through the latter.

The excitation device includes a plurality of slots in the rear face and a power supply layer located behind the rear face and including a plurality of power supply lines, each power supply line being related to a slot, and straddling the related slot so that the point of intersection of the power supply line and the related slot is located in line with an excitation point of the front face.

The slots form circular openings.

The slots form straight openings, the plurality of slots forming a cross, a square parallel to the edges of the elementary antenna, or a square parallel to the diagonals of the elementary antenna.

It is also an object of the invention to have an antenna array composed of a plurality of elementary antennas such as the one disclosed above.

The invention and its advantages will be better understood upon reading the following detailed description of a particular embodiment, given only as a non-limiting example, this description being made with reference to the appended drawings on which:

FIG. 1 shows schematically a view from above of an elementary antenna of the cavity antenna type.

Cavity antennas are known, for example from the paper G. Srivastava and A. Mohan, "A Differential Dual-Polarized SIW Cavity-Backed Slot Antenna," in IEEE Transactions on Antennas and Propagation, vol. 67, no. 5, pp. 3450-3454, May 2019.

The front face of the cavity, which is the radiating element of the elementary antenna 10, lies in a plane defined by the first and second directions, D1 and D2. The first and second directions intersect at a point C, the geometric center of the front face. The front face being preferably square, the first direction corresponds to a diagonal of the front face and the second direction corresponds to the other diagonal of the front face.

The front face is provided with a pair of rectangular slots, 12 and 13, forming a cross pattern. This cross is centered on point C. The slots are arranged to be parallel to the edges of the front face. The cross defines four quadrants on the front face of the elementary antenna.

Figure 1:
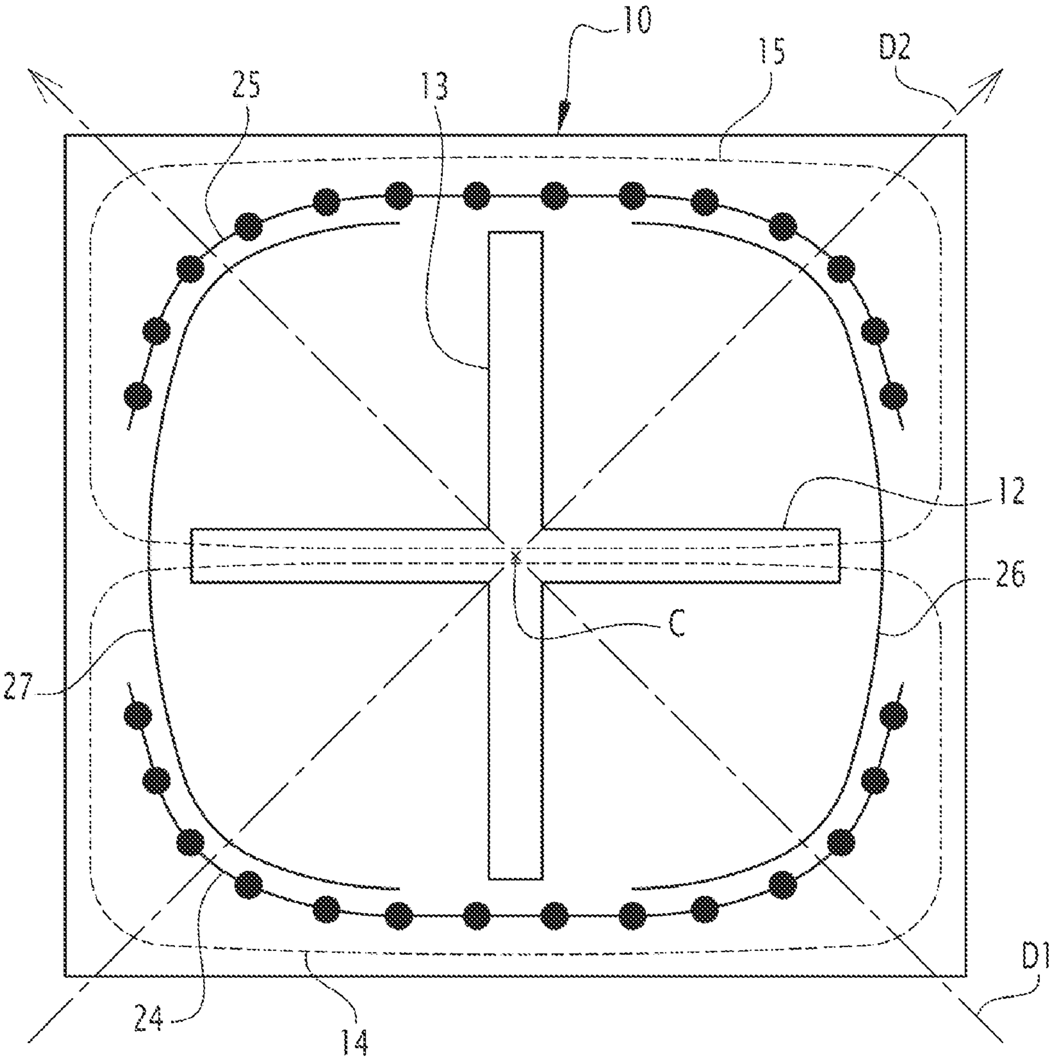
FIG. 1 is a representation of the electric field amplitude in a cavity excited in a TE210 mode.

FIG. 1 shows the amplitude of the electric field inside the cavity when it is excited in the TE210 excitation mode. In this mode, the amplitude of the electric field presents two lobes, 14 and 15, symmetrical relative to the first slot 12. The electric field in these two lobes is in phase opposition: at a given instant, if the electric field in the upper lobe 15 is directed towards the front of the plane of FIG. 1, then the electric field in the lower lobe 14 is directed towards the back of the plane of FIG. 1.

In the excitation TE210 mode and in emission, the elementary antenna 10 emits a polarized wave, perpendicular to the direction of the first slot 12, called by convention "vertical" polarization.

Conversely, on reception, a vertically polarized incident wave is suitable to place the cavity in the TE210 excitation mode.

In a particularly interesting way, all the points on the front face located along curves 24 and 25 present an impedance of 50 Ohms for an electronic emission/reception module electrically connected to one of these points.

There is thus a multiplicity of points on the surface of the front face presenting an impedance of 50 Ohms which can be chosen to excite the front face of the elementary antenna 10 to emit a vertically polarized wave.

Figure 2:
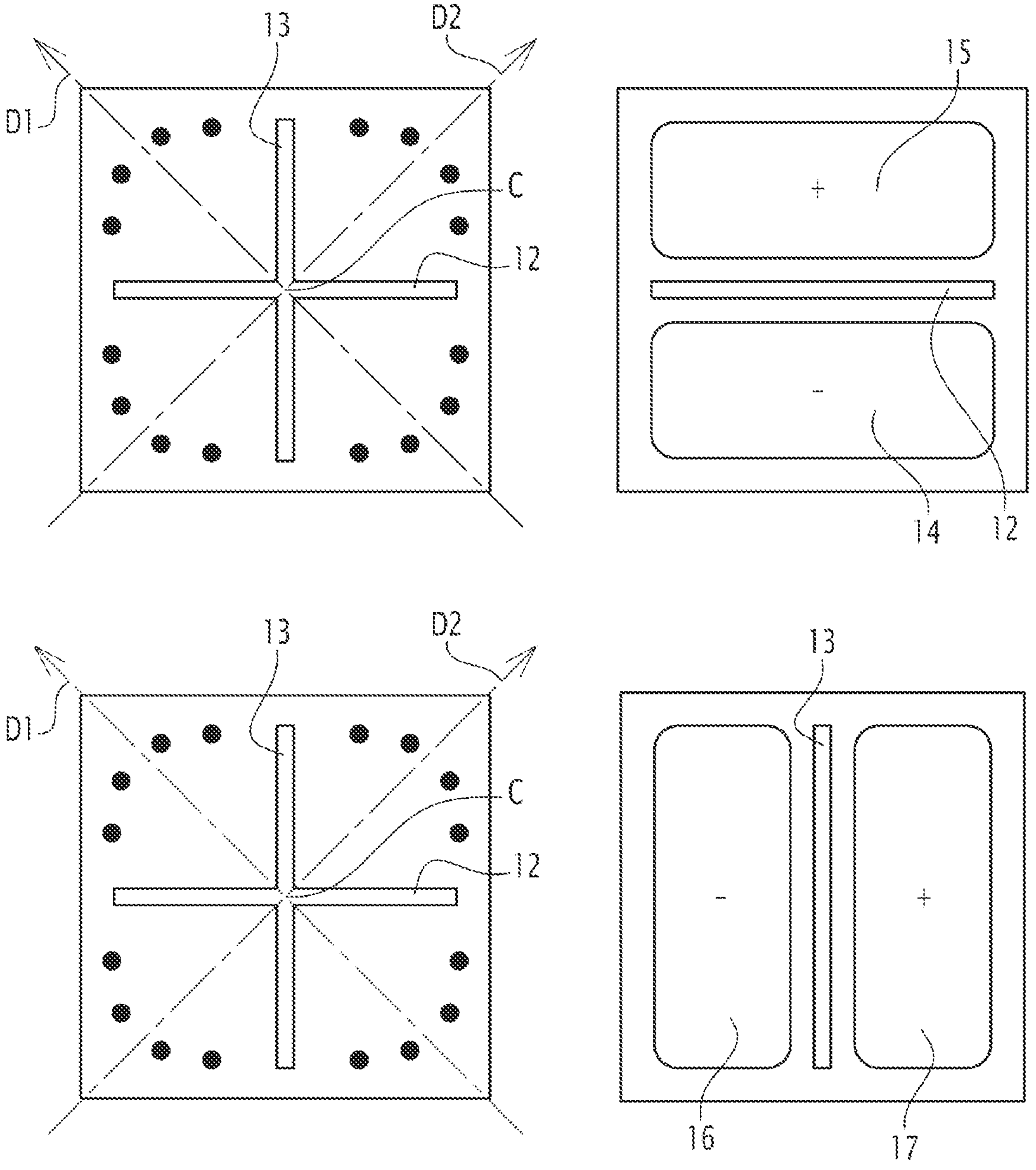
FIG. 2 represents schematically an elementary antenna according to the invention, the front face of which is provided with two slots forming a cross to present a polarization agility in emission and reception.

By symmetry relative to the first direction D1, when the cavity is excited in the T120 mode, the amplitude of the electric field presents two lobes, 16 and 17 (FIG. 2), symmetrical relative to the second slot 13. The electric field in these two lobes is in phase opposition.

In the TE120 excitation mode and in emission, the elementary antenna 10 emits a wave polarized perpendicularly to the direction of the second slot 13, called "horizontal" polarization by convention.

Conversely, in reception, a horizontally polarized incident wave is suitable to place the cavity in the TE120 excitation mode.

All the points on the front panel located along curves 26 and 27 present an impedance of 50 Ohms for an electronic emission/reception module electrically connected to one of these points.

There is therefore a multiplicity of points on the surface of the front face having an impedance of 50 Ohms which can be chosen to excite the front face of the elementary antenna 10 to emit a horizontally polarized wave.

Thus, in order for the elementary antenna 10 to be agile, in other words, able to emit according to a first polarization or according to a second polarization, it is appropriate to excite the front face at excitation points which are selected along the curves 24 and 25 AND along the curves 26 and 27. It is this property that is implemented in the present invention.

By choosing the relative phase of the signals applied to the excitation points of two different quadrants, the polarization in emission or reception can then be chosen either according to the first polarization (so-called vertical polarization—upper part of FIG. 2), or according to the second polarization (so-called horizontal polarization—lower part of FIG. 2) or according to a right circular polarization, or a left circular polarization, or by exciting only the points of the quadrants opposed by the symmetry of center C, +45° (that is, according to the first straight line D1) or −45° (that is, according to the second straight line D2).

Figure 3:
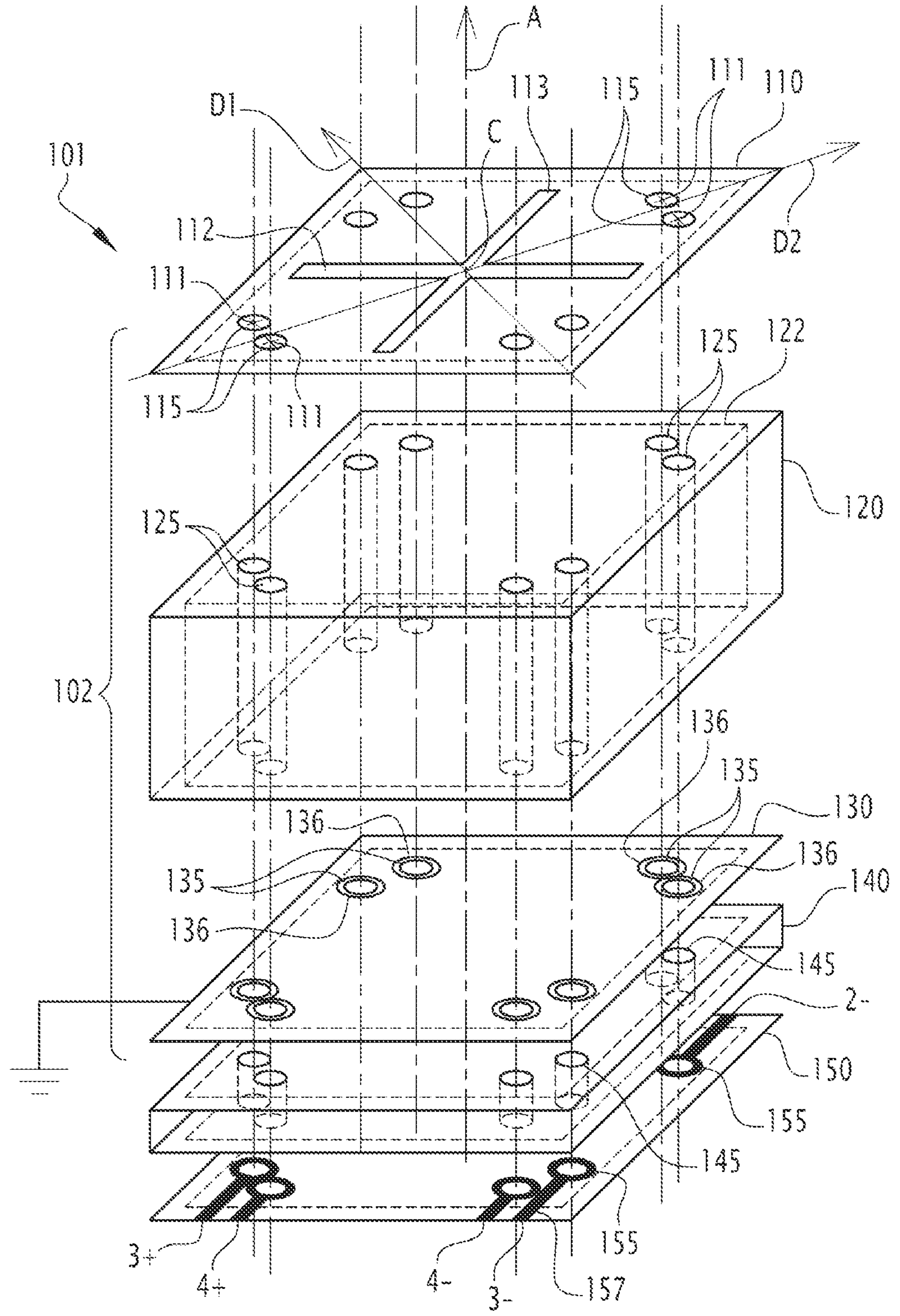
FIG. 3 is an exploded perspective representation of a first embodiment of an elementary antenna according to the invention, in which the front face of the cavity is excited by metallized vias.

Referring now to FIG. 3, a first embodiment of an elementary antenna 101 according to the invention will be presented.

The elementary antenna 101 is of the cavity-backed antenna type. The elementary antenna 101 therefore comprises a cavity 102.

In this embodiment, a front face of the cavity, which is also the radiating element of the elementary antenna, is excited by a device which, in this first embodiment, takes the form of a series of metallized vias passing through the cavity to connect a power supply layer to a plurality of excitation points of the front face.

The elementary antenna 101 includes, successively according to an axis A, a front face 110, a first substrate 120, a rear face 130, a second substrate 140 and a power supply layer 150.

The cavity 102 is delimited according to the axis A by the front and rear faces 110 and 130, and laterally by the side walls 122. Preferably, when the front face is square, the cavity presents the shape of a rectangular parallelogram with a square section (perpendicular to the axis A).

The front face 110 is constituted of a layer of an electrically conductive material, preferably a metal.

Since the front surface 110 is square, the first diagonal corresponds to a first direction D1, and the second diagonal corresponds to a second direction D2. The first and second diagonals intersect at point C, which constitutes a geometric center of the front face.

The front face 110 is provided with a first rectangular slot 112 and a second rectangular slot 113. The first and second slots together form a cross, which is arranged at point C so that the arms of this cross are parallel to the edges of the front face. The cross delimits four quadrants on the front face 110.

The front face 110 is provided with a plurality of perforations 115. Each perforation 115 is centered at an excitation point 111. Each perforation 115 constitutes the end of a metallized via. The inner surface of each perforation 115 is metallized. For simplicity in FIG. 3, the front face 110 of the antenna 101 presents only two excitation points per quadrant, but more excitation points could be provided. An excitation point 111 related to a perforation 115 is positioned on the front face 110 so that the front face 110 constitutes an electrical impedance of 50 Ohms for an emit/receive module electrically connected to the front face by means of the via opening at the level of the considered excitation point.

The first substrate 120 is constituted of an insulating material.

The side walls 122 of the cavity 102 are delimited in the substrate 120. Advantageously, a technique used to produce SIWs (Substrate integrated waveguide) is implemented to produce the side walls of the cavity 102. A side wall is then realized by a row of metallized vias establishing a short-circuit between the rear face 130 and the front face 110 of the cavity 102.

Furthermore, the substrate 120 presents through holes 125 corresponding to the metallized vias opening onto the front face 110. An inner surface of each through hole is metallized.

The rear face 130 is constituted of a layer of an electrically conductive material, preferably a metal.

The layer 130 is electrically connected to a reference potential. It acts as an electrical mirror plane between the power supply layer and the front face.

The rear face 130 includes a plurality of perforations 135, which correspond to the metallized vias connecting the power layer 150 and the front face 110.

To avoid any short circuit between a metallized via and the material constituting the rear face 130 as it passes through it, an insulating ring 136 is provided around each of the perforations 135. The inner face of the perforations is metallized.

The second substrate 140 is constituted of an insulating material.

The second substrate 140 includes a plurality of through-holes 145 respectively constituting portions of the metallized vias between the power supply layer 150 and the front face 110. The inner surface of each through-hole is covered with a metallic film.

Finally, the power supply layer 150 includes perforations 155 that constitute the ends of the metallized vias between the power supply layer 150 and the front face 110. The inner surface of each perforation is covered with a metallic film.

Each perforation 155 is related to a power supply line 157 which is electrically connected to an emission/reception module allowing, in emission, to inject an electric signal to excite the front face in order to emit an electromagnetic wave in the half-space in front of the front face and, in reception, to acquire an electric signal resulting from the excitation of the front face by an electromagnetic wave incident on the front face.

Figure 4:
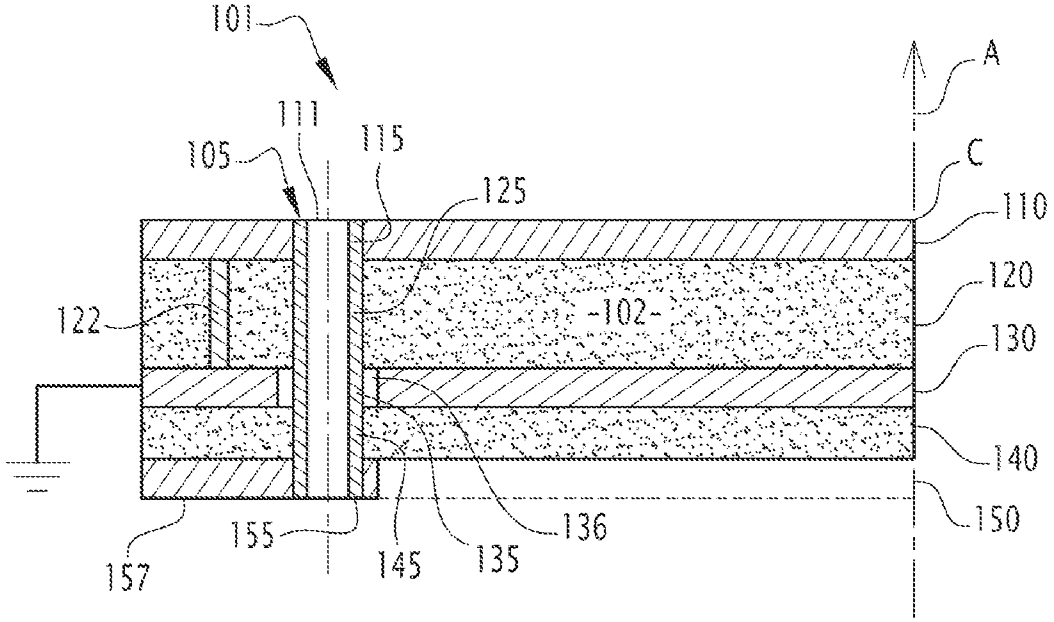
FIG. 4 is a cross-sectional representation in the vicinity of a via of the elementary antenna of FIG. 3.

FIG. 4 shows an axial section of the elementary antenna 101 of FIG. 3 in the vicinity of a metallized via 105 electrically connecting the power supply layer 150 and the front face 110 through the cavity. The layer 150 has been etched to delimit the power supply line 157 allowing the end of the metallized via 105 to be supplied.

Passing through the rear face 130, an insulating ring 136 is interposed between the metal of the rear face 130 and the metallization of the via 105 so as to electrically insulate the via 105 from the rear face 130 brought to reference potential.

A via constituting the side wall 122 of the cavity 102 is shown which provides a short circuit between the rear face 130 and the front face 110 so as to delimit the cavity 102.

Each via is therefore positioned so that it opens, on the front face, at an excitation point characterized by an impedance of 50 Ohms.

Taking account of the property of a cavity antenna to present a large number of excitation points characterized by an impedance of 50 Ohms, it is therefore possible to multiply the vias.

The emitted wave possesses a power which is the sum of the powers of the excitation signals applied to each of the vias. Thus, by multiplying the vias and feeding each channel with a signal close to saturation of the corresponding emit/receive channel, a high-power wave can be emitted.

Symmetrically, in reception, the power of the incident wave is distributed among the different vias. Therefore, by multiplying the vias, each emit/receive channel operates far from saturation.

Figure 5:
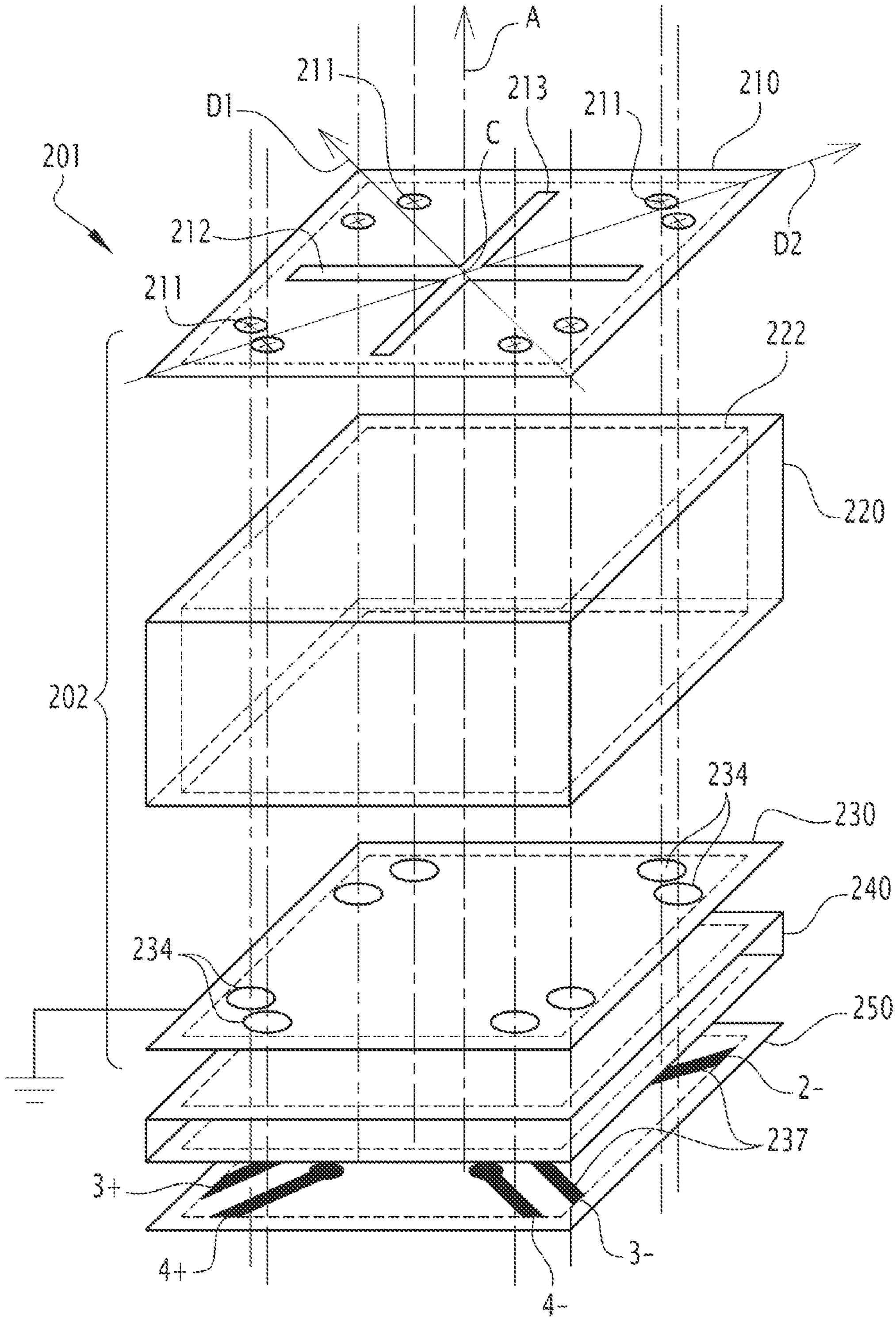
FIG. 5 is an exploded perspective representation of a second embodiment of an elementary antenna according to the invention, in which the front side is excited by slots.

FIG. 5 shows a second embodiment of an elementary antenna of the cavity antenna type according to the invention. In this second embodiment, the excitation device on the front face of the cavity includes slots.

A component of the second embodiment that is identical or similar to a component of the first embodiment is identified by a reference number that is equal to the reference numeral identifying this identical or similar component of the first embodiment, increased by one hundred.

The antenna element 201 includes a cavity 202.

The antenna element 201 includes a front face 210, a first substrate 220, a rear face 230, a second substrate 240 and a power supply layer 250.

The front face 210, which is square and metallic, has a pair of slots, 212 and 213, together forming a cross, centered at point C, and the arms of which are parallel to the edges of the front face.

In the present embodiment, the front face 210 presents no perforations. Only the excitation points 211 have been shown in FIG. 5.

The first substrate 220 delimits the sidewalls 222 of the cavity 202, preferably by means of a row of metallized vias creating a short-circuit between the front face and the rear face of the cavity 202.

The square, metallic rear face 230 is raised to a reference potential. It acts as an electrical mirror plane between the power supply circuit and the front face.

The rear face 230 presents openings 234 constituting slots. These openings present dimension characteristics greater than the perforations and vias of the first embodiment.

In FIG. 5, each slot is a circular opening that is positioned in line with a related excitation point 211 on the front face.

The second substrate 240 is solid.

Finally, the power supply layer 250 has been etched to present a plurality of power supply tracks 237. Each power supply track 237 is related to a slot 234.

Figure 6:
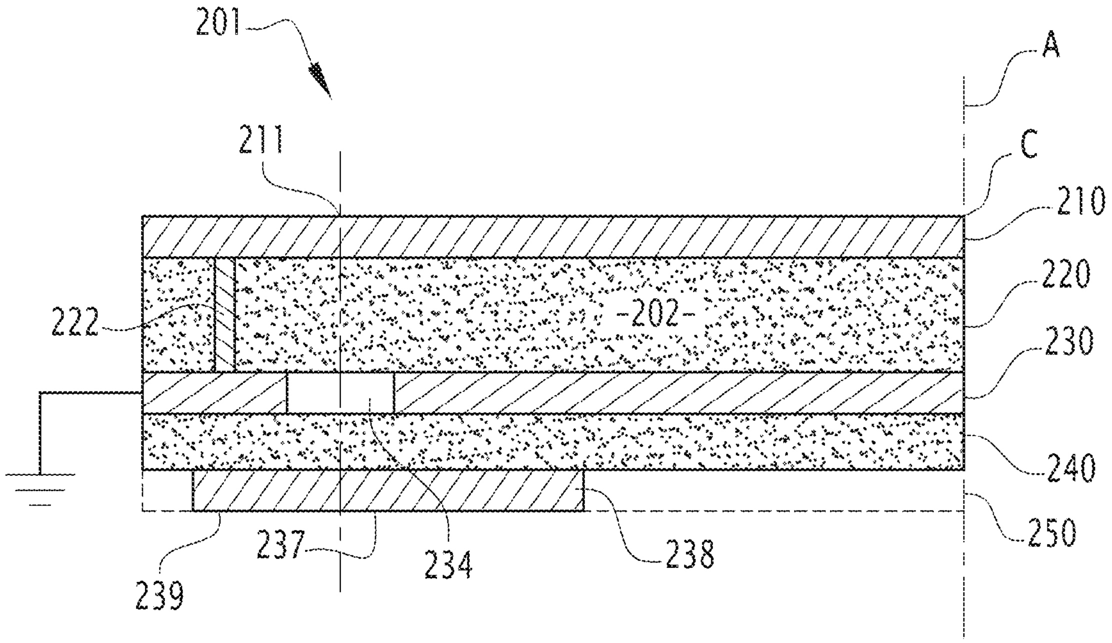
FIG. 6 is a cross-sectional representation in the vicinity of a slot of the antenna of FIG. 5; and, FIGS. 7 to 11 represent, in a view from below, the rear face of different embodiments of the antenna of FIG. 5.

FIG. 6 shows an axial cross-section of the elementary antenna 201 in the vicinity of a slot 234.

The track 237 related to the slot 234 is straight and presents an inner end 238 and an outer end 239. The track 234 straddles the slot 234.

The point of intersection of track 237 and slot 234 is in line with the related excitation point 211.

By properly positioning the power supply tracks 237 and slots 234, a plurality of points on the front face presenting a characteristic impedance can be excited.

In FIGS. 7 to 11, different variations of the second embodiment are shown.

Figure 7:
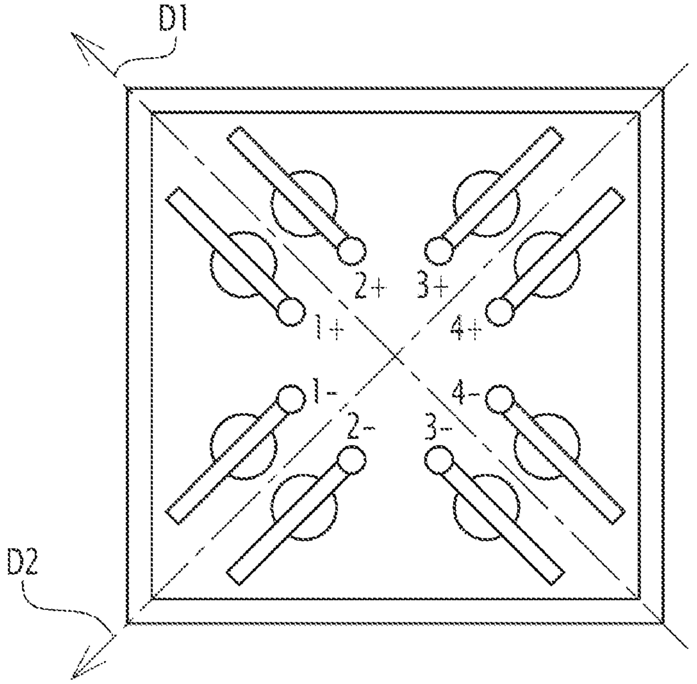

In FIG. 7, the slots are circular openings. Two slots are provided per quadrant. Each slot is related to a power supply track. A power supply track is straight and overlaps the related slot according to the first direction D1 or the second direction D2.

Figure 8:
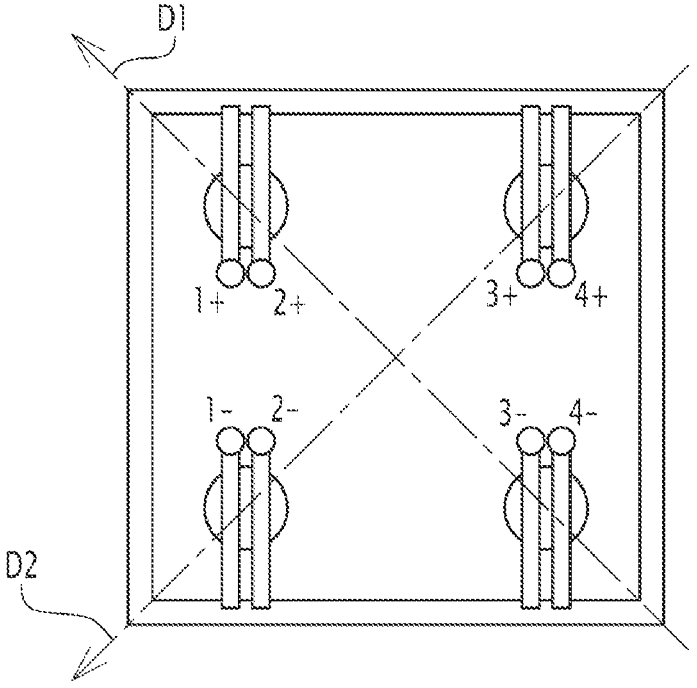

In the variant shown in FIG. 8, the number of slots is reduced to one slot per quadrant. To respect symmetry, the slots are centered on the first direction D1 or the second direction D2. Two power supply tracks are related to each slot. The power supply tracks are straight and extend parallel to the edges of the elementary antenna.

Figure 9:
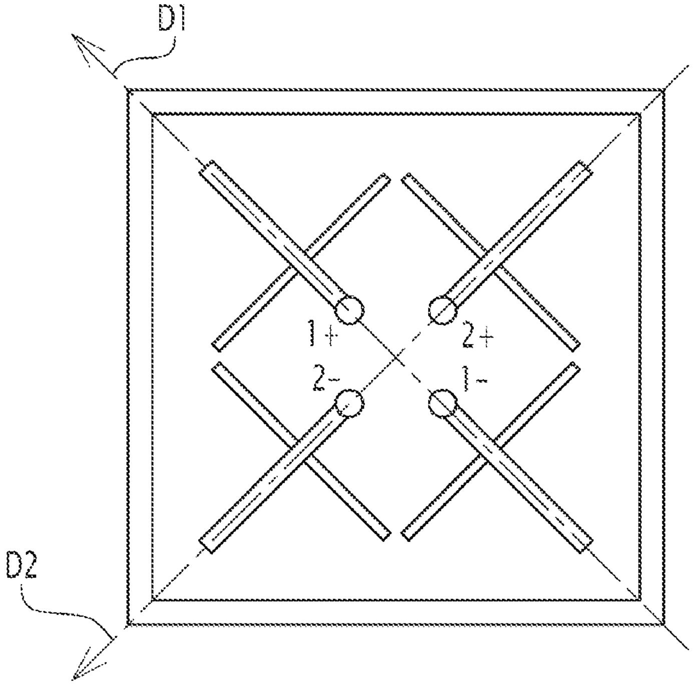

In the variant shown in FIG. 9, the slots are rectangular openings. In this variant, the rear face is provided with four slots. They extend parallel to the first direction D1 or to the second direction D2, but away from the geometrical center C to form substantially a square. Each slot is related to a single power supply track. The power supply track overlaps the related slot in the median plane of said slot.

Figure 10:
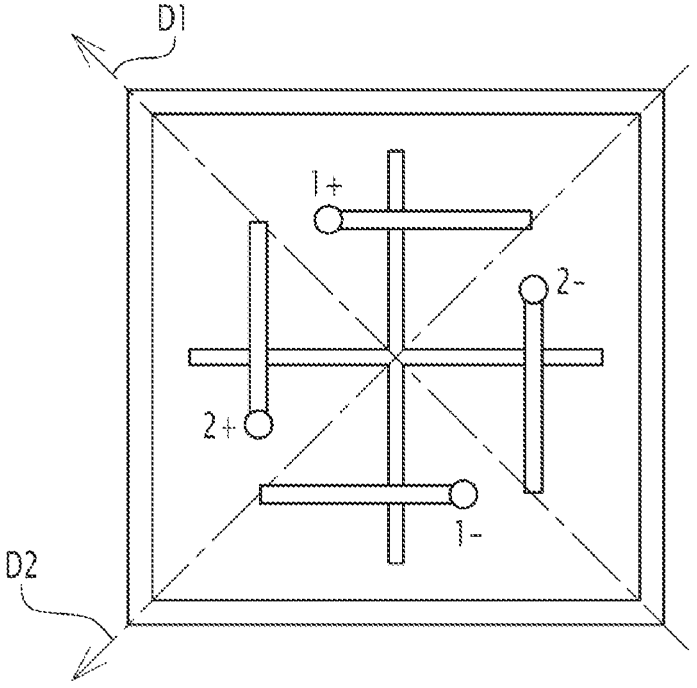

In the variant shown in FIG. 10, the rear face is provided with a pair of straight slots intersecting at right angles at point C. They thus form a cross the arms of which are parallel to the edges of the elementary antenna. Each slot is excited by a pair of power supply lines. A power supply line straddles one of the arms of the related slot. The power supply lines of the same slot are arranged symmetrically by central symmetry.

Figure 11:
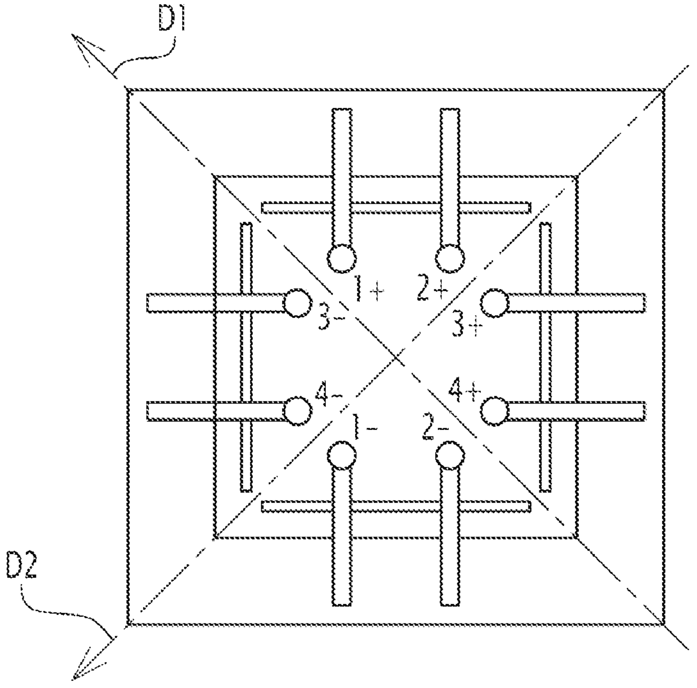

In the variant shown in FIG. 11, the rear face of the cavity is provided with four straight slots, independent of each other. The slots are arranged parallel and close to the edges of the elementary antenna. Each slot is related to a pair of power supply lines, which are arranged symmetrically relative to a median plane of the related slot.

In these various figures, the ends of the power supply tracks of the power supply layer, to which electrical emission signals are applied and/or on which reception signals are collected, are referenced 1+, 1−, 2+, 2−, and possibly 3+, 3−, 4+, 4−.

The following table gives the phase shifts between the electrical signals on each of the ends of the power supply tracks for an operation of the elementary antenna according to a defined polarization.

TABLE 1

| 1+ | 2+ | 3+ | 4+ | 1− | 2− | 3− | 4− | Polarisation |
|---|---|---|---|---|---|---|---|---|
| 0° | 0° | 0° | 0° | 180° | 180° | 180° | 180° | Vertical |
| 0° | 0° | 180° | 180° | 0° | 0° | 180° | 180° | Horizontal |
| 0° | 0° | 90° | 90° | 270° | 270° | 180° | 180° | RHCP |
| 0° | 0° | 270° | 270° | 90° | 90° | 180° | 180° | LHCP |
| OFF | OFF | 0° | 0° | 180° | 180° | OFF | OFF | 45° |
| 0° | 0° | OFF | OFF | OFF | OFF | 180° | 180° | −45° |

"Vertical" polarization means linear polarization according to the bisector between the first and second directions, and "horizontal" polarization means linear polarization according to an orthogonal direction. "RHCP" is a right-hand circular polarization, while "LHCP" is a left-hand circular polarization. A 45° polarization is according to the first direction, while −45° polarization is according to the second direction.

The phase shifts between the electrical signals on the power supply layer tracks detailed in this table for the antennas of FIGS. 7 to 11 also apply to the antenna according to the first embodiment (FIGS. 3 and 4) as well as to the antenna according to the second embodiment (FIGS. 5 and 6).

If the case of excitation points presenting a common impedance of 50 Ohms has been presented above in detail, as a variant the excitation points of the antenna present a common impedance with another value, such as 30 Ohms or 75 Ohms, knowing that the individual access points are arranged along a specific curve of the chosen impedance value.

Thus, the elementary antenna is agile in polarization, both in emission and in reception, by adjusting the phase shift of the electrical signals at each power supply line of the excitation device.

It should be noted that not only according to theory, but also according to various simulations, the teaching of the present description, presented for the case of a cavity with a square cross-section, is applicable to other geometries, in particular, a cavity presenting a circular cross-section. Whatever the geometry of the cavity cross section, the names of the modes are retained: TE210 and TE120 modes are still used for a circular cross section for example.

The invention claimed is:

1. An elementary antenna of a polarization agile type and of a cavity antenna type, including a cavity delimited axially by a front face and a rear face and laterally by side walls, the front face, which constitutes a radiating plane of the elementary antenna, being provided with a first straight slot and a second straight slot, the first straight slot and the second straight slot being arranged so as to form together a cross which is centered on a geometric center of the front face and which defines four quadrants on the front face, the elementary antenna being configured such that, when the cavity is placed in a TE210 mode, a wave polarized perpendicularly to the first straight slot is emitted and when the cavity is placed in a TE120 mode, a wave polarized perpendicularly to the second straight slot is emitted, wherein the rear face is brought to a reference electrical potential, and the elementary antenna includes an excitation device, positioned on a rear of the rear face of the cavity and capable of exciting the front face through the cavity, the excitation device exciting the front face at a plurality of excitation points which present a common predefined impedance, each quadrant of the front face carrying at least one excitation point, wherein the excitation device includes a power supply layer and a plurality of metallized vias, electrically connecting the power supply layer, located at the rear of the rear face, and the front face, the power supply layer including a plurality of power supply lines, each power supply line of the plurality of power supply lines being related to a metallized via of the plurality of metallized vias, each metallized via of the plurality of metallized vias opening, onto the front face, at an excitation point of the plurality of excitation points, and wherein each metallized via of the plurality of metallized vias is insulated from the rear face as it passes through said rear face.

2. The elementary antenna according to claim 1, wherein the front face and the rear face are square and the first straight slot and the second straight slot are arranged parallel to edges of the front face.

3. The elementary antenna according to claim 1, wherein the common predefined impedance of each excitation point of the plurality of excitation points is 50 Ohms.

4. The elementary antenna according to claim 1, wherein the rear face acts as an electrical mirror plane between the power supply layer of the excitation device, the power supply layer being located on one side of the rear face while the front face is located on another side of the rear face.

5. The elementary antenna according to claim 1, wherein two excitation points of the plurality of excitation points that are symmetrically arranged relative to the first straight slot or relative to the second straight slot are excited by signals in phase opposition.

6. The elementary antenna according to claim 1, wherein the excitation device includes a plurality of slots provided in the rear face and the power supply layer located at the rear of the rear face and including the plurality of power supply lines, each power supply line of the plurality of power supply lines being related to a slot of the plurality of slots, and straddling the related slot of the plurality of slots such that a point of intersection of a power supply line of the plurality of power supply lines and the related slot of the plurality of slots is located in line with a related excitation point of the plurality of excitation points of the front face.

7. The elementary antenna according to claim 6, wherein the plurality of slots form circular openings.

8. The elementary antenna according to claim 6, wherein the plurality of slots form straight openings, the plurality of slots forming a cross, a square parallel to edges of the elementary antenna, or a square parallel to diagonals of the elementary antenna.

9. An array antenna including a plurality of elementary antennas, wherein each elementary antenna of the plurality of elementary antennas is the elementary antenna according to claim 1.

10. The elementary antenna according to claim 1, comprising eight assemblies, each assembly of the eight assemblies associating one power supply line of the plurality of power supply lines with one metallized via of the plurality of metallized vias and with one excitation point of the plurality of excitation points.

* * * * *